Feb. 23, 1971  R. HABERT  3,564,639

WINDSHIELD WIPER ASSEMBLY

Filed June 12, 1969

INVENTOR
ROGER HABERT

BY
Amirie & Smiley
ATTORNEYS

United States Patent Office 3,564,639
Patented Feb. 23, 1971

3,564,639
WINDSHIELD WIPER ASSEMBLY
Roger Habert, Paris, France, assignor to Ducellier & Cie,
Paris, France, a corporation of France
Filed June 12, 1969, Ser. No. 832,777
Claims priority, application France, June 20, 1968,
155,784
Int. Cl. B60s 1/42
U.S. Cl. 15—250.32                                6 Claims

ABSTRACT OF THE DISCLOSURE

The free end of the oscillating arm of a windshield wiper assembly and the connector head of the stirrup assembly which carries the wiper blade are slip-fitted together and the arm has a projection received in an opening in the connector head to interlock them. The interlock is releasably held by a leaf spring which bears upon the arm opposite the interlock. The latching lever has a cam which engages the leaf spring and rotates the lever to bear against the arm when the arm is between the leaf spring and the connector head. The lever may be manually swung away from the arm to allow the interlock to be disengaged and the parts separated. The free end of the leaf spring is angled to form a guide for inserting the arm in place and additional guides in the form of guide ears may be provided.

BACKGROUND OF THE INVENTION

The interconnection between the oscillating arm of a windshield wiper and the connector head of the blade assembly usually are either positively interconnected so as to require the use of a tool to separate or connect them, or they are connected loosely so that positive interconnection is obtained only through the medium of the pressure exerted by the arm in pressing the blade against the windshield.

In the former case, the need for a tool to change the blade assembly is an undesirable inconvenience, whereas in the latter case, the blade assembly may be disengaged inadvertently from the arm whenever the arm and blade are swung away from the windshield, as when cleaning the latter.

BRIEF SUMMARY OF THE INVENTION

The present invention relates to a latching arrangement between the oscillating arm of a windshield wiper and the connector head of the wiper blade assembly in which the latching arrangement includes a latching lever cooperating with a leaf spring to maintain a positive interlocking interengagement between the arm and connector head but wherein the latching lever may be manually swung to released position allowing the parts to be separated.

The latching lever is provided with cam means which serves not only to retain the leaf spring assembly in place but also causes the latching lever to bear against the arm opposite the interlock to retain the parts normally in place. The leaf spring is retained within a channel and one end is adapted to bear against the oscillating arm and an intermediate U-shaped portion thereof cooperates with a cam fixed to the latching lever so that when the arm is interposed between the bight of the channel and the end of the leaf spring, the latching lever is rotated aginst the arm and bears thereagainst to maintain the interlock although the lever may be manually pivoted in opposition to the leaf spring to a position allowing the arm to be disengaged and withdrawn from the connector head.

BRIEF DESCRIPTION OF THE DRAWING FIGURES

DETAILED DESCRIPTION OF THE INVENTION

Figure 1:
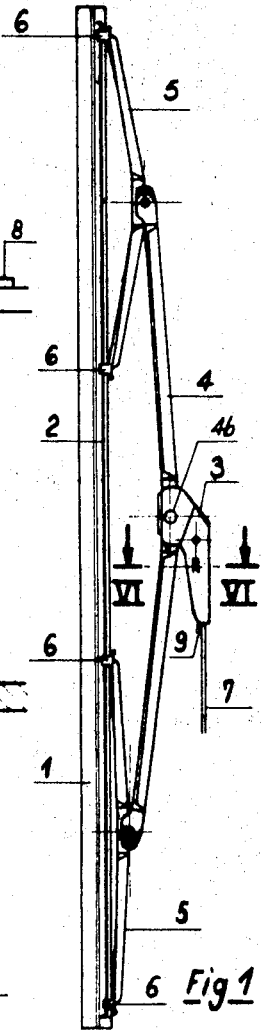
FIG. 1 is a side elevational view illustrating a windshield wiper blade and a portion of the oscillating arm provided with the latching means according to the present invention.

Referring to FIG. 1, a windshield wiper blade is indicated therein by the reference character 1 and, as is conventional, it is constructed of resilient material such as rubber and is provided with a flexible metal backing strip 2 with which the bifurcated ends 6 of a pair of stirrups 5 are slidably engaged. The main stirrup 4 is pivotally connected at its opposite ends to the central portions of the respective stirrups 5 and a connector head 3 is pivotally connected to the central portion of the main stirrup 4. The connector head 3 is detachably connected to the driving or oscillating arm 7 of the windshield wiper drive assembly and a matching lever 9, as hereinafter described, is provided to serve to quickly disconnect and connect the arm 7 to the connector head 3.

Figure 2:
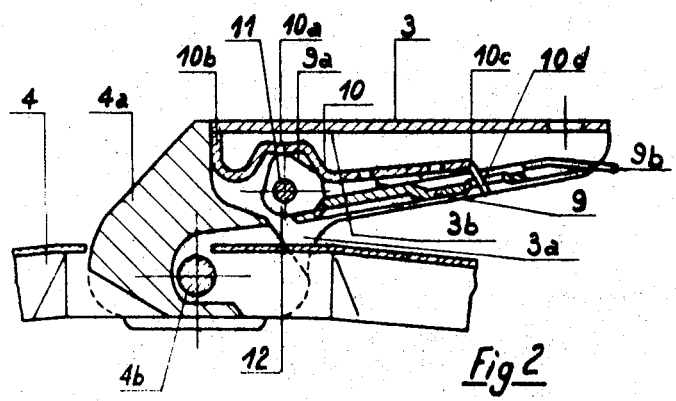
FIG. 2 is an enlarged longitudinal section through the connector head and illustrating the leaf spring and latchig lever with the wiper arm removed.

With reference to FIG. 2, it will be seen that the connector head 3 includes a boss portion 4a pivotally connected to the stirrup 4 by means of the pivot pin 4b and, extending laterally from the boss portion, the connector head presents a channel portion provided by the bight portion 3b and depending legs 3a. Loosely received within the channel is a leaf spring 10 having an upturned end portion 10b bearing against the undersurface of the bight portion 3b and having an opposite end portion 10d extending angularly divergently with respect to the bight 3b to present a bearing portion 10c whose purpose will be presently apparent. The leaf spring 10 also includes a U-shaped intermediate portion 10a cooperative with the cam means 12 which forms part of the latching lever assembly 9.

The latching lever 9 is pivotally mounted between the legs 3a by means of the pivot pin 11 and the free end 9b of the latching lever extends outwardly slightly beyond the confines of the channel as illustrated in FIG. 2 so as to be available for manual manipulation in the fashion hereinafter described.

Figure 3:
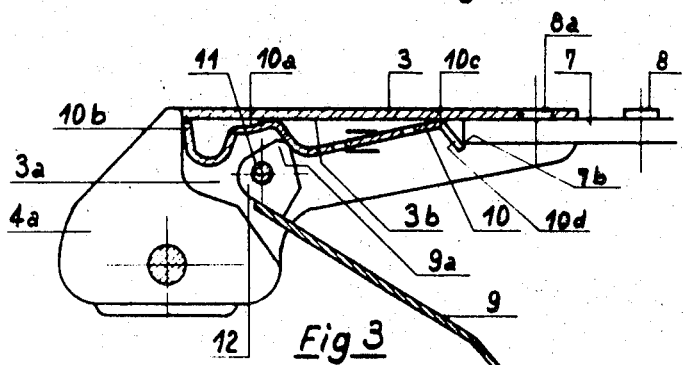
FIG. 3 is a view similar to FIG. 2 but showing the latching lever in the released position and the wiper arm in the process of being inserted into the channel of the connector head.
Figure 4:
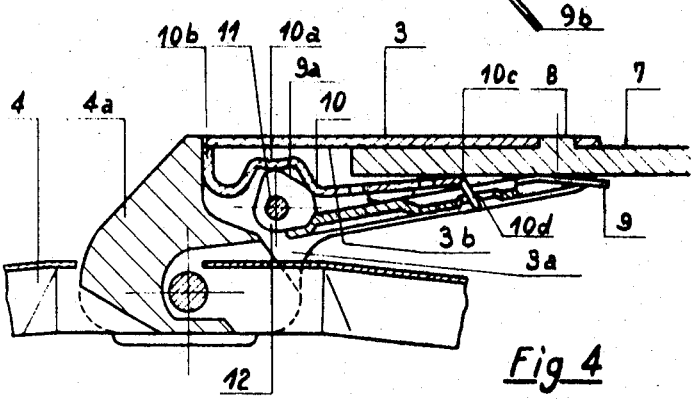
FIG. 4 is a view similar to FIGS. 2 and 3 but showing the disposition of component parts when assembled.

The cam 12 is captive within the U-shaped portion 10a of the leaf spring and holds the latter in place within the channel and, as is shown in FIG. 3, when the wiper arm 7 is removed from the channel, the latching lever 9 is free to swing downwardly as illustrated. When, however, the end of the arm 7 is inserted into the channel such that the edge 7b thereof engages the angled end 10d of the leaf spring, the end 10d forms a mouth for guiding the arm 7 and swings the leaf spring 10 away from the bight 3b and, in the process, rotates the latching lever 9 upwardly so that it bears against the arm 7 in the fashion illustrated in FIG. 4. The latching lever 9 is provided with an opening receiving the end 10d of the leaf spring and the bearing engagement of the latching lever 9 against the arm 7 serves to maintain interlocked engagement between the arm 7 and the channel member. For this purpose, the channel member may be provided with an opening 8a in the bight portion 3b thereof and the arm is provided with a projection 8 received in such opening, substantially as is shown. The lobe 9a of the cam 12 causes the latching lever 9 to swing upwardly and to bear against the arm 7 so that when the parts are positioned as is illustrated in FIG. 4, the lobe 9a bears directly against the U-shaped portion 10a of the leaf spring 10. Thus, the insertion of the arm 7 into the channel serves automatically to effect the latching action and when it is desired to separate the component parts, the arm 7 is swung outwardly away from the windshield to allow the wiper blade assembly to be rotated to permit the latching lever 9 to be swung downwardly to the position shown in FIG. 3 whereafter the arm 7 and connector head 3 may be relatively pivoted to separate the interlock 8, 8a and allow withdrawal of the connector head beyond the arm 7. However, it will be appreciated that the parts may not inadvertently be separated as, for example, incidental to washing the windshield assembly with the arms 7 swung outwardly to swing the wiper blade assemblies away from the windshield.

Figure 5:
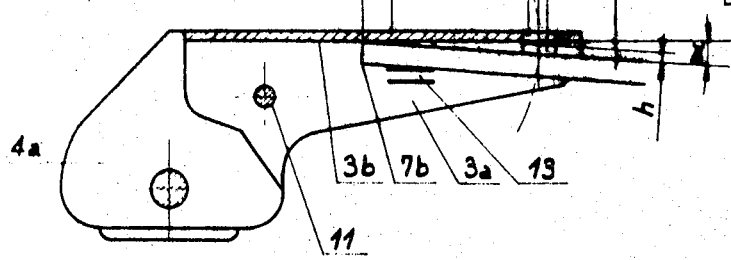
FIG. 5 is a view illustrating a modified form of the invention.
Figure 6:
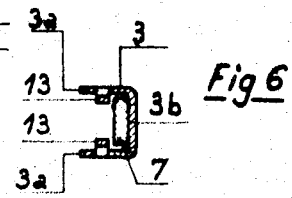
FIG. 6 is a transverse section taken generally along the plane of section line 6—6 in FIG.1 and illustrating the modification shown in FIG. 5.

In the modification of the invention shown in FIGS. 5 and 6, the legs 3a of the channel may be provided with inwardly struck ears 13 which are so located below the bight 3b as to guide the free end of the arm 7 and limit its inward extension into the channel such as positively to locate the projection 8 opposite the opening 8a as illustrated, thus facilitating the insertion of the arm 7 into the connector head. The remainder of the component parts are identical to those described above in conjunction with FIGS. 2-4. In any event, it will be appreciated that the end 10d of the leaf spring presents a mouth for guiding the free end of the arm 7 into the channel and that the secondary guide means 13 may be provided which allows the arm to clear the bight by the spacing h as shown in FIG. 5 when the arm is disposed angularly as shown with respect to the connector head 3 and thereby effect alignment between the projection 8 and the opening 8a.

What is claimed is:

1. A windshield wiper assembly comprising, in combination,
    a resilient wiper blade,
    an arm for oscillating said blade,
    a stirrup assembly connecting said blade to said arm, said stirrup assembly including a connector head having a U-shaped portion presenting a bight and spaced legs defining a channel,
    said arm having a free end portion received within said channel,
    interlocking means interacting between said arm and said connector head for preventing longitudinal movement therebetween, and
    latching means for maintaining said interlocking means in operative engagement, said latching means comprising a leaf spring within said channel, a latching lever pivotally connected at one end to said connector head and having its opposite end bearing upon said arm in the region of said interlocking means, and a cam at said one end of the latching lever engaging said leaf spring to urge said opposite end of the latching lever against said arm.

2. A windshield wiper assembly as defined in claim 1 wherein said leaf spring includes a free end portion engaging said arm between the free end of the latter and said interlocking means.

3. A windshield wiper assembly as defined in claim 2 wherein said interlocking means comprises an opening in said bight and a projection on said arm fitted within said opening.

4. A windshield wiper assembly as defined in claim 3 wherein said free end portion of the leaf spring is divergent with respect to said bight to form a mouth therewith to guide said arm into said channel.

5. A windshield wiper assembly as defined in claim 4 including a pair of ears projecting inwardly from said legs in spaced relation to said bight for guiding the free end of said arm.

6. A windshield wiper assembly as defined in claim 1 wherein said leaf spring is loosely received in said channel and includes an end portion engaging said bight, an opposite end portion engaging said arm, and an intermediate U-shaped portion receiving said cam.

References Cited
UNITED STATES PATENTS 2,807,822  10/1957  Scinta _____ 15—250.32

FOREIGN PATENTS 1,096,916  12/1967  Great Britain _____ 15—250.32

ERNEST R. PURSER, Primary Examiner